March 11, 1958   G. E. UNDY   2,826,720
ELECTRICAL CONTROL SYSTEM
Filed June 27, 1946   2 Sheets-Sheet 1
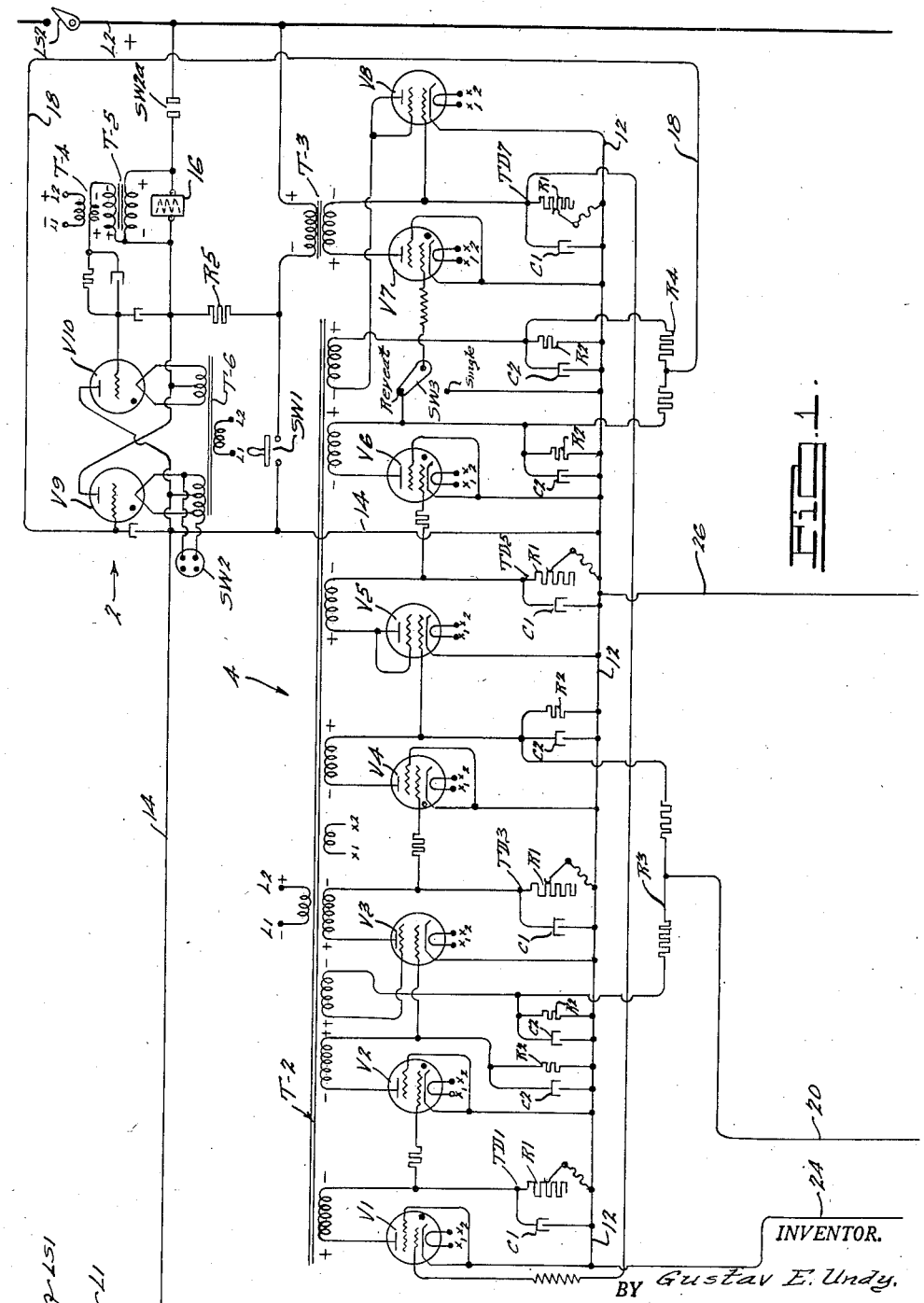
INVENTOR.
BY Gustav E. Undy.
ATTORNEYS.

March 11, 1958
G. E. UNDY
2,826,720
ELECTRICAL CONTROL SYSTEM
Filed June 27, 1946
2 Sheets-Sheet 2
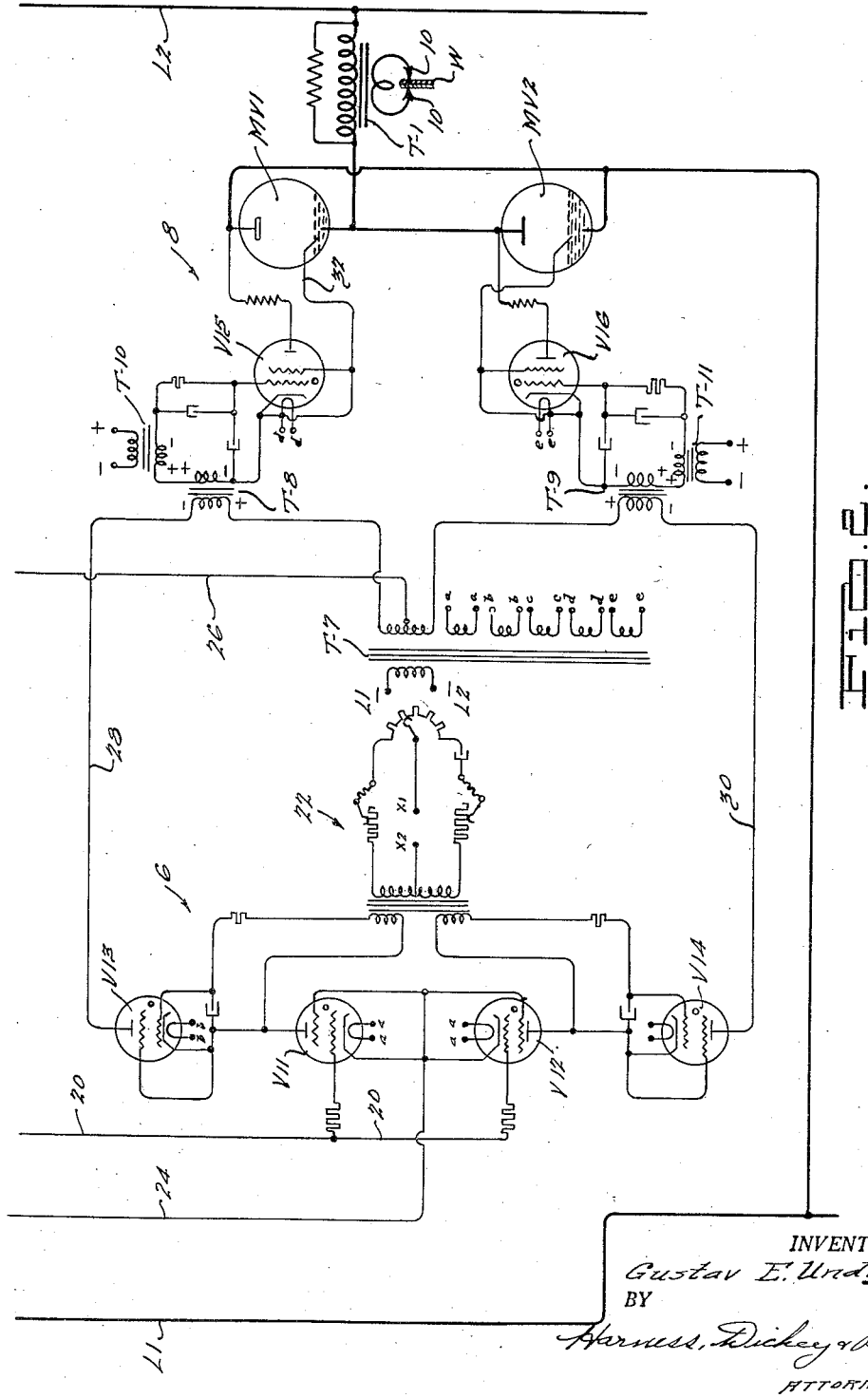
INVENTOR.
Gustav E. Undy.
BY
Harness, Dickey & Pierce
ATTORNEYS.

United States Patent Office 2,826,720
Patented Mar. 11, 1958

2,826,720

ELECTRICAL CONTROL SYSTEM

Gustav E. Undy, Detroit, Mich., assignor to Weltronic Company, Detroit, Mich., a corporation of Michigan Application June 27, 1946, Serial No. 679,840

48 Claims. (Cl. 315—166)

This invention relates generally to timing mechanisms and is particularly adapted for controlling welding apparatus.

The principal objects of the present invention are to provide a control system of the above type which is simple in arrangement, economical of manufacture, and which is extremely efficient and accurate in its operation; to provide improved timing mechanism which is quick in operation and accurate in its control; to provide in such a system full electronic control, thereby eliminating the necessity for slow-acting relays and their other inherent troubles; to provide in such a system means whereby, when a cycle is initiated, it will continue through the entire cycle irrespective of operation of the initiating switch; to provide such a timing apparatus which will provide for one complete welding cycle or will provide for a continuing number of welding cycles for the period that the initiating switch remains closed; to provide fully electronic timing means for determining the squeeze times, the welding time, the holding time, and the off time for a welding machine. Further objects will be apparent from the specification and the appended claims.

A preferred but illustrative embodiment of the invention is shown in the accompanying drawings and in which drawings Figures 1 and 2 together diagrammatically show a welding control system embodying the invention, and, when Figure 2 is placed directly to the right of Figure 1, the various unconnected lines of one drawing will line up with the various unconnected lines of the other drawing.

It will be appreciated, from a complete understanding of the present invention, that, in a generic sense, the improvement thereof may be embodied in electric control systems intended for various specific purposes and that such control systems may be variously arranged. In its present preferred form, the invention is utilized to control electric welding circuits of the impulse type, and, by way of illustration but not of limitation, the invention is so disclosed herein.

Referring to the drawings by characters of reference, the system comprises generally an initiating network 2, a sequence network 4, an indexing network 6, and a firing network 8 supplied with electrical energy from alternating current supply lines L1 and L2. The sequence network 4 acts, upon energization of the initiating network 2, to control the various operational steps of the welding mechanism to which the control system may be applied, as, for example, the "clamping time" or period when the electrodes 10 are being clamped against the work W to be welded, the "firing time" or interval when the firing network 8 is supplying welding current to the welding transformer T1, the "hold time" or time when the electrodes 10 are maintained against the work W after the weld has been completed, and the "off time" or time between the welds of a series of welds.

Referring more specifically to the sequence network 4, the network comprises a plurality of interconnected electronic valves V1—V8 which are directly and continually electrically connected together by impedance networks embodying no movable contacts. Valves V3, V5, and V8 are shown as being the high vacuum-type, while the valves V1, V2, V4, V6, and V7 are shown as being the gas-filled or discontinuous control-type. The gas-filled type can be used in all instances, if desired. Valves V1, V3, V5, and V8 are normally conductive, and valves V2, V4, V6, and V7 are normally blocked or nonconductive. All of the cathodes of the valves V1—V8 are directly connected to a common cathode bus 12 which is maintained at the potential of the supply line L1 by a conductor 14. Each of the anodes of valves V1—V6 and V8 is connected to one terminal of separate secondary coils of a transformer T-2 energized from the main power supply lines L1 and L2. The anode of the valve V7 is connected to one terminal of the secondary coil of a transformer T-3 of the network 2 energized from the lines L1 and L2 upon closure of a normally open starting switch SW1. The other terminals of the secondary coils of the transformers T-2 and T-3 are connected to the bus 12 through impedance networks, thereby completing the anode circuits of valves V1—V8. In the case of the valves V1, V3, V5, and V7, the impedance networks are time-delay circuits TD1, TD3, TD5, and TD7 comprising a condenser C1 parallelly connected with a resistor R1. The resistor R1 can be adjustable for controlling the rate of discharge of the associated condenser C1 and thereby the length of time delay afforded by the network. In the case of the valves V2, V4, V6, and V8, the networks comprise a condenser C2 and a resistor R2 connected in parallel, the values of the condensers C2 and resistors R2 being so chosen that the condensers C2 will discharge through their associated resistors R2 in the time required for the voltage of lines L1 and L2 to make about one or two complete cycles.

The phasing of the secondary coils of transformers T-2 and T-3 with respect to the phasing of the lines L1 and L2 which is indicated in the network 4 is desirable to provide a very fast operating sequence timing. However, in the broader aspects of this invention, if maximum speed is not desired, the phasing can be at random.

The grids of the valves V2—V6 and V8 are respectively connected to the anode circuit of the valves V1—V5 and V7 intermediate the transformer T-2 and the associated impedance network, so that when a valve is conducting, the grid of the next valve controlled thereby will be rendered negative with respect to the cathode bus 12 and the valve so controlled rendered nonconductive. The grid of valve V7 is connected to the arm of a single-pole, double-throw switch SW3 whereby the grid can be connected either to the anode circuit of the valve V6 intermediate the transformer T-2 and the associated network for repeat operation or may be directly connected to the bus 12 for single operation. Valve V3 has a supplemental anode connected to one terminal of a secondary coil of the transformer T-2. The other terminal of this coil is connected to an impedance network similar to that associated with the valve V2 which comprises a parallelly connected resistor R2 and condenser C2. If desired, a separate valve rendered conductive and nonconductive synchronously with valve V3 may be used in place of the supplemental anode of valve V3.

A center tapped resistor R3 is connected between the anode circuit of the valve V4 adjacent the terminal of the impedance network thereof opposite that connected to the bus 12 and the supplemental anode circuit of the valve V3 adjacent the corresponding terminal of its impedance network and having a much greater value than that of the resistor R2, their ratio being in the neighborhood of 100—1. Therefore, when valve V3 is conducting, the resistor R3, in effect, will be essentially in parallel with the resistor R2 of the network associated with the supplemental anode of valve V3. The center tap connection of R3 therefore will be negative relative to bus 12 and line L1 an amount substantially equal to one half the voltage across R2 of this network. Similarly, when valve V4 is conducting, the resistor R3, in effect, is essentially in parallel with the resistor R2 of the impedance network of valve V4 and the center tap connection of R3 will likewise be negative relative to bus 12 and line L1 an amount substantially equal to one half the voltage across R2 of this network. A similar resistor R4 is similarly connected between the anode circuits of valves V6 and V8, so that whenever either of the valves V6 or V8 is conducting, the potential of the center tap of the resistor R4 will be negative with respect to the bus 12 and line L1.

The initiating network 2 comprises a pair of parallel circuits connected between the line L1 (by means of conductor 14) and line L2. The first of these circuits contains the switch SW1 and the primary coil of the transformer T-3 in series, while the second contains a pair of back-to-back electronic valves V9 and V10 and the energizing circuit of the pressure control 16 which causes the welding electrodes 10 to be moved and held against the work W. A resistor R5 interconnects the two parallel circuits from a point in the first circuit intermediate switch SW1 and transformer T-3 to a point in the second circuit intermediate the valves V9—V10 and the control 16 whereby the switch SW1 and valves V9 and V10 will be in parallel and the transformer T-3 and control 16 will be in parallel. The value of the resistor R5 is such, however, that when switch SW1 is closed and valves V9 and V10 are not conducting, insufficient current will flow to the control 16 for its operation; however, when the valves V9 and V10 are conducting and switch SW1 is open, sufficient current will flow to the transformer T-3 to supply anode voltage to the valve V7.

The valve V9 is normally held in a nonconductive or blocked condition by the negative bias supplied thereto by a conductor 18 from the center tap of the resistor R4. Valve V10 is a trailing valve and is normally maintained nonconductive or blocked by the negative bias supplied by a transformer T-4, in the grid circuit, at all times when the anode of valve V10 is positive with respect to its cathode. A transformer T-5 has its primary coil connected in parallel with the control 16 and its secondary coil in series with the transformer T-4 in the grid circuit so that the collapse of flux in the transformer T-5 at the end of a conductive half cycle of the valve V9 will induce a potential opposing that of the transformer T-4 and render the grid of the valve V10 positive and the valve conductive. Valves V9 and V10 are both of the discontinuous control type, so that, when once rendered conductive, the grid loses control.

The heaters for the cathodes of the valves V9 and V10 are energized from a transformer T-6 which also supplies the energizing current to a time-delay switch SW2 having contacts SW2a in series with the control 16. The contacts SW2a remain open-circuited for a predetermined time interval after initial closing of the line disconnect switches LS1 and LS2 to allow all the anodes of the valves in the circuit to heat up before the electrodes 10 may be brought into welding position to prevent any possible false welds. The switch SW2 can be either of the type that requires a predetermined time after energization to close its contacts SW2a irrespective of the time it has been de-energized or can be of the type which, up to its maximum time-delaying interval, acts to close the contacts SW2a at a time delay proportional to the de-energized time. The difference between the two operations becomes of note only when the line switch LS1 or LS2 is opened momentarily and reclosed after the system has been placed in operation and the valves heated.

Indexing network 6 comprises a pair of valves V11 and V12 which are normally biased to a nonconducting or blocked condition by the potential supplied to their grids through a conductor 20 from the center tap of the resistor R3, and a pair of valves V13 and V14 controlled by a phase-shifting circuit 22 energize from a secondary coil of the transformer T-2 as indicated by the reference characters $x1$ and $x2$ appearing in the circuit 22 and on the output terminals of the transformer T-2. The circuit 22 is more completely described and claimed in my copending application Serial No. 696,945, filed September 13, 1946, now Patent No. 2,723,167. The cathodes of the valves V11 and V12 are connected together and to the center tap of a secondary coil of a transformer T-7 energized from the line conductors L1 and L2 by a conductor 24 connected to the bus 12 and a conductor 26 leading from the bus 12 to the center tap. The anode of the valve V11 is connected to the cathode of the valve V13, and the anode of the valve V13 is connected by a conductor 28 to one end terminal of the center-tapped secondary coil of the transformer T-7. The valves V12 and V14 are likewise connected in series circuit arrangement and to the other end terminal of the center-tapped secondary coil of the transformer T-7 by a conductor 30. Primary coils of transformers T-8 and T-9 are connected in series circuit in the conductors 28 and 30 respectively. The secondary coil of the transformer T-8 is connected into the grid-controlling network of a valve V15 arranged to control the conductivity of a main gaseous discharge rectifier MV1. A transformer T-10, energized from the lines L1 and L2, normally acts to maintain the grid of the valve V15 negative with respect to its cathode at all times when the anode thereof is positive, so that the valve V15 is normally maintained in a nonconductive or blocked condition. However, when the series-connected valves V11 and V13 are rendered conductive and current passes through the conductor 28, the transformer T-8 is so polarized with respect to the transformer T-10 that the potential supplied to the grid-controlling circuit of the valve V15 by the transformer T-8 overcomes that supplied by the transformer T-10 so that the grid of the valve V15 is rendered positive with respect to the cathode and the valve V15 consequently becomes conductive. Conduction of the valve V15 causes the critical potential necessary to fire the main rectifier MV1 to be applied between its igniter 32 and its cathode, whereby the rectifier MV1 is rendered conductive. It should be noted in this regard that the anode potential for the valve V15 is supplied by the voltage drop across the rectifier MV1, which voltage drop, when the rectifier MV1 is nonconductive, is substantially the line voltage between the lines L1 and L2; but, when the rectifier MV1 is rendered conductive, this voltage drop is very low; therefore, even though valve V15 is maintained in a current-conducting condition by the transformer T-8, substantially no current will flow in the igniter circuit during the periods that the rectifier MV1 is conducting. The transformer T-9 is similarly related with a transformer T-11 connected in the grid circuit of a valve V16, similar to the valve V15, for controlling a second main gaseous-discharge rectifier MV2 connected in back-to-back relation with the rectifier MV1 whereby alternating current can be supplied to the welding transformer T-1.

The phasing of the phase-shifted potential applied to the grid of the valve V13 and of the anode potential supplied thereto, as well as the phasing of the transformers T-8 and T-10 and of the potential supplied to the rectifier MV1 must be properly arranged as shown, so that when the circuit through the valves V11 and V13 is completed and a grid biasing potential is applied to the grid of the valve V15 to render it conductive, the proper potentials are applied across the rectifier MV1 and the valve V15. If the phasing of the grid circuit for the valve V13 was not correct, it would be impossible to regulate the point along the voltage wave at which the valve V13 is rendered conductive. Similarly, the voltages applied to the valves V12, V14, and V16, the rectifier MV2, and the transformers T-7, T-9, and T-11 must be properly phased so that when the valves V12 and V14 conduct and the grid of the valve V16 is rendered positive with respect to its cathode, the correct polarity of potential will be across the valve V16 and the rectifier MV2.

It is thought that the remaining details of the system may best be understood with reference to a description of the operation of the system. Assuming that it is desired to condition the system for operation, the usual disconnect switches LS1 and LS2 may be closed, thereby connecting the line conductors L1 and L2 to the source of supply which may be a conventional sixty-cycle alternating current system. Energization of the lines L1 and L2 energizes the transformer T-2, whereby the heaters for each of the valves V1—V8 are energized from the secondary coil having the reference characters $x1$ and $x2$ as is indicated by the reference characters $x1$ and $x2$ appearing on the heaters of the valves V1—V8. Transformer T-6 is likewise energized for supplying heating current to the valves V9 and V10 and initiating the operation of the time-delay switch SW2. At this time the contacts SW2a of the switch SW2 will be open, as well as the contacts of the switch SW1, whereby current flow through the control 16 will be prevented so that the welding electrodes 10 will not be moved into welding position. Closure of the line switches LS1 and LS2 also energized the transformer T-7 which, as indicated by the reference characters aa, bb, cc, dd, and ee, energized the heaters for the valves V11, V12, V13, V14, V15, and V16 respectively. As soon as the valves V1—V16 inclusive are heated so that the valves are in operating condition, the system will stabilize itself, the valves V1, V3, V5, and V8 rendered conductive, and the rest of the valves V2, V4, V6, V7, and V9 through V16 blocked. Before this condition occurs, however, certain other of the valves can be rendered conductive for short periods of time, depending upon the rate of "heat up" of the various valves, before the proper grid bias potentials can be applied to the various valves. Such transitory operation of the various valves is without effect, however, upon the output of the system, due to the open switch contacts SW2a which prevent movement of the welding electrodes 10 into work-engaging position.

With switch SW1 open, the transformer T-3 will be de-energized so that there will be no current flow in the anode circuit of the valve V7 and consequently no voltage drop through the time-delay mechanism TD7. The grid of the valve V8 will be at cathode potential and the valve V8 will be conductive. Furthermore, since there is no voltage drop across the time-delay mechanism TD7, the grid of the valve V1 which is maintained at the same potential as the grid of the valve V8 will be at cathode potential and the valve V1 will conduct. When the valve V1 conducts, a voltage drop across the resistor R1 of the time-delay means TD1 is set up which will render the grid of the valve V2 negative with respect to its cathode, and the valve V2 will be held nonconductive or in a blocked condition. This bias between the cathode and grid of the valve V2, due to the capacity of the condenser C1, is substantially a D. C. bias, so that irrespective of the phasing of the secondary coils of the transformer T-2 supplying potential to the anode circuits of the valves V1 and V2, the valve V2 will be held in blocked condition, the condenser C1 having more than enough capacity to supply the necessary direct-current bias during the opposite half cycle to the half cycle when the valve V1 is conducting. Similarly, the remainder of the condensers C1 and C2 are likewise of sufficient capacity to supply direct current during the opposite half cycle to the half that is being charged.

Valve 72 being blocked as hereinbefore described, there will be no voltage drop across the impedance network associated with its anode circuit, and the grid of the valve V3 will be at the same potential as its cathode, and the valve V3 consequently will be in a conducting condition. Anode current will flow through the time-delay mechanism TD3, so that there will be a voltage drop thereacross, and the grid of the valve V4 will be held negative with respect to its cathode to hold the valve V4 in a nonconducting or blocked condition. The valve V4 being blocked, there will be no potential drop across the impedance network associated therewith, and the grid of the valve V5 will be at the same potential as its cathode, so that the valve V5 will be in a conducting condition. Current in the anode circuit of the conducting valve V5 will set up a potential drop across the time-delay means TD5 so that the grid of the valve V6 will be maintained at a negative potential with respect to its cathode, and valve V6 will consequently be maintained in a nonconductive or blocked condition. Since the valve V8 is conducting, current flow through its impedance network will set up a voltage drop across its resistor R2 which also appears across the parallelly connected center-tapped resistor R4 to maintain the grid of the valve V9 negative with respect to its cathode and the valve V9 in a nonconducting or blocked condition. Since, as hereinbefore set forth, the valve V10 is purely a trailing valve and will not conduct unless the valve V9 has conducted during the preceding half cycle and always will conduct if the valve V9 has conducted during the preceding half cycle, the valve V10 also will be blocked.

The valve V3 has a supplemental anode which, when the valve V3 is conducting as is the present case, will cause a current flow through the secondary coil of the transformer T-2 associated therewith, and a voltage drop will be maintained across its impedance network and across the parallelly connected resistor R3, the center tap of which is connected by means of the conductor 20 to the grids of the valves V11 and V12. The cathodes of these valves V11 and V12 are maintained by the conductor 24 at the same potential as the bus 12 so that the valves V11 and V12 will be maintained in a nonconducting or blocked condition. Since the valves V11 and V12 are in series circuit with the valves V13 and V14 respectively and the valves V11 and V12 are held in blocked condition as hereinbefore set forth, it is immaterial whether the valves V13 and V14 are rendered conductive as to whether current will flow through the transformer T-8 or T-9. Since no current is flowing to the transformers T-8 and T-9, the transformers T-10 and T-11 will respectively maintain the valves V15 and V16 blocked. Since the rectifiers MV1 and MV2 can conduct only if fired by the valves V15 and V16 respectively, rectifiers MV1 and MV2 likewise will be held in a nonconducting or blocked condition.

Now assume that the required time for the switch SW2 to close its contacts SW2a has elapsed and the contacts SWAa have been closed and that the switch SW3 is set in the position shown in Fig. 1 for repeat welding operation. The starting switch SW1 is now closed, energizing the primary coil of the transformer T-3 and applying a potential across the circuit comprising the resistor R5 and the control 16. As stated hereinbefore, the value of the resistor R5 is such that when potential is applied across this path the current flow therethrough is not sufficient to cause operation of the control 16. Energization of the transformer T-3 supplies potential to the anode circuit of the valve V7, and, since its grid is now at the same potential as its cathode, due to the fact that the valve V6 is in a blocked condition, the valve V7 will conduct and current will flow through the anode circuit thereof and through the time-delay mechanism TD7 which decreases the potential of the grid of the valve V8 rendering it nonconductive or blocked.

Since the valve V8 is no longer conducting, the voltage drop across the impedance network of its anode circuit and across the resistor R4 disappears, so that the center tap of the resistor R4 assumes the same potential as the bus 12 and the conductor 14, thereby removing the blocking or negative bias from the valve V9 and placing the valve V9 in a conducting condition. Anode current of the valve V9 flows through the control 16 to the line L2, energizing the control 16 and causing the electrodes 10 to be moved toward each other and in engagement with the work W.

The primary coil of the transformer T-5 is connected in parallel circuit with the control 16 and causes a controlling potential to be induced in the grid circuit of the valve V10 opposing that of the transformer T-4 so that the valve V10 will fire or conduct during the subsequent half cycle to the conduction of the valve V9. At the same time that the potential of the grid of the valve V8 is rendered negative with respect to its cathode, the potential of the grid of the valve V1 is likewise rendered negative with respect to the potential of its cathode and the valve V1 rendered nonconductive or blocked, such blocking being without immediate effect because of the action of the time-delay means TD1. At a predetermined subsequent time interval, depending upon the setting of the resistor R1, the condenser C1 of the time-delay means TD1 will have discharged through its discharge resistor R1 and the potential drop across the resistor R1 will have disappeared. This renders the grid of the valve V2 at the same potential as the cathode thereof, and the valve V2 will now be in a conductive condition and will permit current to flow through its anode circuit. This flow of current in the anode circuit of the valve V2 sets up a potential drop across the impedance network associated therewith which immediately renders the grid of the valve V3 negative with respect to the cathode thereof, thereby blocking or rendering nonconductive the valve V3. The immediate effect of this blocking of the valve V3 is to cause the potential drop across the impedance network associated with the supplemental anode of the valve V3 and the parallel resistor R3 to disappear and the center tap connection thereof to be rendered at the same potential as the bus 12. This removes the negative bias of the valves V11 and V12, and they are immediately rendered in a conductive condition and will remain in such condition until a negative bias is again supplied.

Rendering of the valve V11 conductive may not immediately energize the transformer T-8, it also being necessary, in addition to having the valve V11 conductive, to have the valve V13 conductive. The phase-shifting circuit 22 supplies a biasing potential to the grid of the valve V13 which is adjustable in time along the voltage wave supplied between the lines L1 and L2 so that the amount of welding energy taken from succeeding corresponding half cycles of the voltage wave can be controlled. Assuming that the phase-shifting circuit 22 is rendering the valve V13 conductive, current will flow through the conductor 28 and the transformer T-8 which will cause a positive potential to be applied to the grid of the valve V15 to render it conductive. Rendering of the valve V15 conductive will cause the critical potential to be applied between the igniter 32 and the cathode of the rectifier MV1 to render the rectifier MV1 conductive for supplying current to the primary coil of the welding transformer T-1. Likewise, during the opposite half cycle of the voltage wave, valve V14 will control energization of the transformer T-9 to provide for rendering the valve V16 conductive during the proper portions of the voltage cycle so that the rectifier MV2 will be rendered conductive to supply the proper energy to the welding transformer T-1 during the opposite half cycle to that when the rectifier MV1 is supplying current to the transformer T-1.

When the valve V3 was rendered nonconductive or blocked, the condenser C1 was charged, maintaining a potential drop across the time-delay means TD3, so that the grid of the valve V4 was maintained negative with respect to its cathode. Subsequently, however, the condenser C1 of the time-delay means TD3 discharges through its resistor R1 and the potential drop across the means TD3 disappears, so that the grid of the valve V4 is raised to the same potential as its cathode and the valve V4 rendered conductive.

As soon as the valve V4 begins to conduct, a voltage drop appears across the impedance network in the anode circuit thereof, which voltage drop appears across the resistor R3 so that the center tap thereof is rendered negative with respect to the bus 12. This negative potential is conducted by means of the conductor 20 to the grids of the valves V11 and V12, rendering them again in a nonconducting condition ending the time period when the valves V13 and V14 will permit current flow through the transformer T-8 and T-9 respectively. The time interval between the time that the valve V3 was blocked and the time-delay means TD3 was operative to maintain the grid of the valve V4 negative with respect to its cathode is the length of time that the welding current may be supplied to the transformer T-1. In other words, this time is the length of time that the grids of the valves V11 and V12 are left in an unbiased condition.

When valve V4 was rendered conductive, a potential drop appeared across the resistor R2 of its anode circuit and the grid of the valve V5 rendered negative with respect to its associated cathode, thereby rendering the valve V5 nonconducting or in a blocked condition. This blocking of the valve V5 is without immediate effect, due to the action of the time-delay means TD5. After the expiration of the time for which the means TD5 is set, the potential of the grid of the valve V6 will become that of the bus 12 and the cathode of the valve V6, and the valve will become conductive. Conduction of the valve V6 sets up a potential drop across the impedance network in its anode circuit which, with the switch SW3 set at repeat, will supply a negative potential to the grid of the valve V7, rendering it nonconductive or in a blocked condition and setting up a corresponding potential drop across the resistor R4, whose center tap connection is connected by means of a conductor 18 to the grid of the valve V9. This negative potential renders the grid of the valve V9 negative with respect to its cathode and the valve V9 nonconductive. Consequently the valve V10 will also become nonconductive. The blocking of the valves V9 and V10 de-energizes the control 16, allowing the welding electrode 10 to move away from the work W.

Rendering of the valve V7 nonconductive is without immediate effect, due to the potential maintaining characteristics of the time-delay means TD7 which continues to maintain the grid of the valve V8 negative with respect to the cathode until such time as the charge has dissipated from the condenser C1 of the means TD7, at which time the potential of the grid of the valve V8 becomes that of its cathode and the valve V8 becomes conductive.

Conduction of the valve V8 sets up a potential drop across the impedance network in its anode circuit, thereby maintaining the entire resistor R4 at a heavy negative potential with respect to the bus 12 and maintaining the valve V9 continually blocked. At the same time that the valve V8 is rendered conductive, the negative potential from the grid of the valve V1 disappears so that it becomes conductive and sets up a potential drop across the time-delay means TD1, which, as hereinbefore stated, causes the grid of the valve V2 to be rendered negative and the valve V2 blocked. Blocking of the valve V2 causes the potential drop across the impedance network in its anode circuit to disappear and with it the negative bias on the grid of the valve V3 to render valve V3 conductive. Conduction of the valve V3 sets up a potential drop across the time-delay means TD3 which renders the grid of the valve V4 negative with respect to its cathode, and the valve V4 is consequently blocked. Blocking of the valve V4 causes the potential drop across the impedance network in its anode circuit to disappear and consequently the negative bias on the grid of the valve V5 so that the valve V5 is again rendered conductive.

When the valve V3 became conductive, current began to flow in the supplemental anode circuit thereof setting up a potential drop across the impedance network associated in this supplemental anode circuit which rendered the potential of the entire resistor R3 at a very negative potential similar to that of the resistor R4 upon conduction of the valve V8, which highly negative potential is conducted through the conductor 20 to the grids of the valves V11 and V12, maintaining the same blocked. When the valve V4 became blocked, the potential of the terminal of the resistor R3 connected to the anode circuit of the valve V4 went to the potential of the cathode bus 12 and the potential of the grids of the valves V11 and V12 became less negative, but still negative enough to prevent the valves from becoming conductive.

As valve V5 became conductive due to the disappearance of the potential drop across the impedance network of the anode circuit of the valve V4, a potential drop appeared across the time-delay means TD5 which rendered the grid of the valve V6 negative with respect to its cathode and placed the valve V6 in a nonconductive or blocked condition. As the valve V6 became blocked, the potential drop across the impedance network in its anode circuit disappeared and the negative potential transmitted to the grid of the valve V9 by conductor 18 became somewhat less negative but remained, however, sufficiently negative to prevent conduction of the valve V9. This disappearing of the drop in potential across the impedance network of the anode circuit of the valve V6, however, did remove the negative bias on the grid of the valve V7 so that the valve V7 was again rendered in a conductive condition to initiate another welding cycle similar to the one just described.

If, however, during this last welding cycle or any subsequent welding cycle the switch SW1 is moved to open position, the removal of the negative bias on the grid of the valve V7 due to the blocking of the valve V6 cannot cause current flow through the anode circuit of the valve V7 because at such time both the switch SW1 will have been open and the valves V9 and V10 rendered nonconductive, and the welding will cease. should the switch SW1 be open during an intermediate portion of the welding cycle, it will be without effect, because the valves V9 and V10 are in effect a holding circuit across the contacts of the switch SW1 and will maintain the transformer T-3 energized through the resistor R5 until such time as the valves V9 and V10 are rendered nonconductive.

Now let us suppose that the switch SW3, instead of being in the position as shown connecting the grid circuit of the valve V7 in the repeat position, was in the single-operation position. The cycle of operation up to the time that the valve V6 is rendered conductive will be identical to that described hereinbefore in connection with the operation with the switch SW3 at repeat condition. In this instance, with the switch SW3 at single-operation position, conduction of the valve V6 has no effect on the valve V7, because the grid of valve V7 is directly connected to the bus 12 and maintained at the same potential as its cathode and will continue conducting for an indefinite period, thereby maintaining the valve V8 in a blocked condition and also maintaining the valve V1 in its blocked condition. The valve V9 will likewise remain blocked due to the negative bias placed on its grid by the potential set up across the resistor R4 due to the conduction of the valve V6. If now the switch SW1 is held closed, the valves V2, V4, V6, and V7 will remain conductive and valves V1, V3, V5, V8, V9, and V10 will be rendered or held blocked. Opening of the switch SW1, however, will de-energize the transformer T-3, since, as hereinbefore stated, the valves V9 and V10 have previously been de-energized, thereby de-energizing the anode circuit of the valve V7. After a suitable time interval, as determined by the time-delay mechanism TD7, the valve V8 will again be rendered conductive and the valve V1 will also be rendered conductive, setting up a chain of events, causing the valves V1, V3, and V5 to be rendered conductive and valves V2, V4, and V6 to be rendered nonconductive and placed in the initial condition which existed subsequent to closure of the line switches LS1 and LS2.

As stated hereinbefore, the phasing of the output of the transformer T-2, with the exception of the phasing of the transformer T-2 with respect to the phase-shifting circuit 22, is immaterial with respect to the functioning of the control system in its broadest aspects. However, it is desired that the phasing be as shown, so that the system will operate at the maximum possible speed. It will be further obvious that with the system as shown, the need for relays having movable contact elements with their inherent operating deficiencies is eliminated. It will be noted that the various valves of the sequence network 4 are all directly and continually electrically coupled to each other and by which definition is meant there are no movable elements such as relays embodied in their coupling circuits.

What is claimed and is desired to be secured by United States Letters Patent is as follows:

1. In a timing apparatus for controlling the sequence of a plurality of operations, electrical networks for timing said operations, each said network comprising an electric valve having an anode circuit including a time-delay means chargeable by anode current flow in said circuit, means directly and continually electrically interconnecting said networks whereby the network for each successive operation after the first said operation is rendered operable subsequent to the timing out of said time delay means of the network for a preceding operation, means for initiating the operation of said networks, and means rendered effective as a consequence of the operation of one of said networks for removing the electrical potential from said valve of one of said networks.

2. In a timing apparatus for controlling the sequence of a plurality of successive operations, electrical networks corresponding to said operations for timing said operations and controlling the sequence thereof, each said network comprising a first and a second electric valve normally maintained in an original condition and circuit means including time-delay means interconnecting corresponding first and second valves whereby each said second valve is rendered in its operation controlling condition at a predetermined time interval subsequent to the corresponding said first valve being rendered in its operation controlling condition, circuit means interconnecting said networks whereby said first valves of said networks subsequent to said network controlling the first sequence operation are successively rendered in their operation controlling condition by the rendering of said second valves of the respective preceding networks in their controlling condition, means for rendering said first valve of said network controlling the first sequence operation in its controlling condition and including means actuated as a consequence of the rendering of said second valve of the last of said networks in its controlling condition for restoring said first valve of the first of said networks to its said original condition.

3. In a timing apparatus, a plurality of interconnected networks arranged to function in sequence, each of said networks comprising a pair of valves, one valve of each of said pair being normally conducting, the other valve of each of said pair being normally held nonconducting by the corresponding said one valve, control means for controlling the conductivity of said one valve of the first of said pairs of valves and including means for rendering said one valve of said first pair of valves nonconductive, time-delay means rendering each said other valve of each said pair conducting at a predetermined time interval subsequent to each corresponding said one valve being rendered nonconductive, and means operable to render said one valve of each of said successive pairs of valves subsequent to said first pair nonconductive subsequent to said corresponding said other valve of each preceding said pair of valves being rendered conducting, said control means including means responsive to the conductivity of said other valve of the last to be operated of said pairs for restoring said one valve of the first said pair to its conductive condition and thereby restoring the remaining said valves to their respective normal conditions.

4. In a current-controlling apparatus, valve means adapted to govern flow of current and having two conditions of operation, means including a pair of control valves each adapted when in a conducting condition to maintain said valve means in one of said conditions of operation and effective while both said control valves are in a nonconducting condition to maintain said valve means in its other condition of operation, means normally maintaining one of said control valves in a conducting condition and including control means operable to render said one control valve nonconducting, and time-delay means normally effective to maintain the other control valve nonconducting and operable as a consequence of said one control valve being rendered nonconducting to render the other of said control valves conductive after a predetermined time interval, whereby during said time interval said valve means is maintained in the second of said conditions of operation and is restored to said first condition of operation at the end of said time interval.

5. In a current-controlling apparatus, a pair of series-connected valve means adapted to govern the flow of current, one of said valve means being controlled by a grid normally biased to render said one valve means effective, a pair of control valves, each of said control valves being operable to bias said grid in opposition to said normal bias to maintain said one valve means ineffective, means rendering one of said control valves ineffective to bias said one valve means ineffective, time-delay means operable upon said one control valve being rendered ineffective to render the other of said control valves effective to bias said one valve means ineffective, and phase-shifting means for biasing the other of said valve means effective at predetermined time intervals.

6. In a controlling system, control means, switch means for energizing said control means, valve means having main electrodes, said electrodes being connected in parallel circuit arrangement with said switch means and operable to maintain said control means energized after initial energization thereof by said switch means, and means operable by said control means for maintaining said valve means conductive.

7. In a control system, a source of power, a first control means, a pair of electronic valves arranged in back-to-back relation in series with said control means and across said source, a circuit adapted for connection across said source, an initiating switch and a second control means arranged in series in said circuit, impedance means interconnecting said circuit and said valves whereby said switch and said impedance means are arranged in parallel with said valves and whereby said first and second control means are arranged in parallel with each other through said impedance means, the current flow capacity of said impedance means being so related to the current required to operate said first control means that closure of said switch can energize solely said second control means, the current flow capacity of said impedance means being sufficient to energize both of said control means.

8. In a timing apparatus for controlling the sequence of a plurality of operations, a controlling network for each operation, each controlling network comprising grid-controlled valve means having an anode circuit including a time-delay impedance network for said anode circuit, an initiating network comprising grid-controlled valve means having an anode circuit, means for energizing said initiating network, and means operable by said initiating network anode circuit for maintaining said initiating network energized, said initiating network circuit being operable to control the conductivity of the first of said controlling networks.

9. In a timing apparatus for controlling the sequence of a plurality of operations, an electrical network for each of said plurality of operations, certain of said networks comprising an electric valve having an anode circuit with an impedance element in series circuit therewith, each said certain network valves having a cathode and a controlling electrode, means connecting said networks for sequential operation including an electrical circuit connecting said controlling electrode and said cathode of a subsequent one of said certain networks across said element of a preceding one of said networks, the last to operate of said networks being one of said certain networks, means for initiating the operation of said networks and including control means the potential across which determines the operation of said network, and circuit means for applying the potential developed across said element of said last network across said control means.

10. In a timing device, a plurality of sequentially actuated electric valves; certain of said valves having a pair of main electrodes and a control electrode; individual impedance networks individually coupled with said main electrodes of said certain valves and arranged to be energized upon conduction of the respective said valves with which such networks are associated; means normally supplying an alternating potential between said main electrodes of at least some of said certain valves; circuit means for applying a potential, proportional to that appearing across said network associated with a just prior operated one of said certain valves, between one of said main electrodes and said control electrode of the next to be operated one of said certain valves to thereby prevent conduction through said next to be operated valve while said potential is above a predetermined value; an initiating network for initiating an operation of said sequentially actuated valves and including an initiating valve having a pair of main electrodes and a control electrode and including circuit means for controlling the application of potential between said main electrodes of said initiating valve; said circuit controlling means including selectively operated means for controlling the application of potential to said initiating network whereby said initiating network is operable to cause said plurality of valves to be sequentially actuated and to actuate said circuit controlling means to a condition to maintain potential between said main electrodes of said initiating valve; and means responsive to a function of the potential appearing across said impedance network associated with the last to be operated one of said certain valves for controlling the application of a bias potential between said control electrode and one of said main electrodes of said initiating valve.

11. In a timing device, a sequencing network comprising a plurality of electric valves adapted to be rendered from a first to a second condition in a predetermined time sequence, means adapted to maintain a potential between main electrodes of certain of said valves, circuit controlling means including a contactor and an electric valve having its main electrodes connected in parallel with said contactor, and an initiating network for actuating said sequencing network and including an initiating valve, said circuit controlling means being adapted to control the application of potential between the main electrodes of said initiating valve, and means actuated by said initiating network for controlling said circuit controlling means.

12. In a timing device, a plurality of sequentially actuated networks, each said network comprising an electric valve having a pair of main electrodes, means normally maintaining a supply of alternating potential across said main electrodes of certain of said valves, first and second control means for controlling the supply of alternating potential across said main electrodes of at least another of said valves, said second control means comprising an electric valve having its main electrodes connected in parallel with said first control means and rendered effective to supply said potential to said other valve as a consequence of the supply of potential to said other valve by said first control means.

13. In a current-controlling apparatus, valve means adapted to govern flow of current and having a main electrode and a control electrode, a pair of valves each having a first and a second electrode, each said valve having an impedance element connected between its said first and said second electrode, means connecting said main electrode and said first electrodes together, each said impedance element having a terminal electrically spaced from the respective said first electrode to which it is connected, impedance means interconnecting said terminals and having an intermediate connection, and circuit means connecting said intermediate connection with said control electrode.

14. The combination of claim 13 in which one of said pair of valves comprises a third main electrode and the other of said pair of valves comprises a control electrode, impedance means connected between the first and third electrodes of said one valve and having a point electrically spaced from the first electrode of said one valve, and circuit means connecting said point with the control electrode of said other valve of said pair.

15. The combination of claim 14 in which said last-named impedance means includes an energy storage device.

16. In a timing apparatus, a plurality of electrical networks, each said network comprising an electric valve having a control element and a pair of main electrodes, each said network further comprising an anode circuit for said valve electrodes including a pair of electrically spaced points whereby the potential between said points is a function of the conductivity of said valve, an electrical continuous connection for applying the potential appearing between said points of a preceding network between said control element and said one electrode of a subsequent network whereby said subsequent network is controlled by said preceding network, a pair of series connected impedance elements connected between corresponding first ones of said points of two of said networks, and a local control circuit connected between corresponding second ones of said points and the common point of said impedance elements.

17. In a timing apparatus, a plurality of electrical networks, each said network comprising an electric valve having a control element and a pair of main electrodes, each said network further comprising an anode circuit for said valve electrodes including a point electrically spaced from one of said electrodes whereby the potential between said one electrode and said point is a function of the conductivity of said valve, an electrically continuous connection between the said one electrodes of each of said networks, an electrical continuous connection between said one point of a preceding network to said control element of a subsequent network whereby said subsequent network is controlled by said preceding network, a pair of series connected impedance elements connected between said points of two of said networks and having a common point therebetween, and a local control circuit connected between said first-named continuous connection and said common point.

18. In an alternating current timing network for controlling the sequence of a plurality of operations, a plurality of electric valves adapted to be actuated in sequence, each said valve having a pair of principal electrodes and a control electrode, a principal electrode circuit for each of said valves including conductors adapted to be energized from a source of alternating potential, a plurality of time delay impedance networks, individual ones of said networks being individually connected in series in at least some of said principal electrode circuits, circuit means affected by the potential appearing across said delay networks of prior to be actuated ones of said valves and connected between said control electrode and one of said principal electrodes of next to be operated said valves, each said time delay network being operable upon as a consequence of conduction through the valve with which it is associated to establish a potential thereacross of sufficient magnitude and such polarity as to hold the respective said next to be operated valve nonconductive, each said time delay network having a time constant such that said established potential will be maintained for an interval greater than a half period of said alternating potential.

19. In a pulsating electrical timing network for controlling the sequence of a plurality of operations, a plurality of electric valves adapted to be actuated in sequence, each said valve having a pair of principal electrodes and a control electrode, a principal electrode circuit for each of said valves including conductors adapted to be energized from a source of periodic potential, time delay impedance networks, individual ones of said networks being individually connected in series in at least some of said electrode circuits, each said delay network comprising an energy storage device and an impedance element connected across said device to provide a discharge circuit therefor, circuit means energized by the potential appearing across prior to be actuated said delay networks and connected between said control electrode and one of said principal electrodes of next to be operated said valves, each said time delay network being operable as a consequence of the conduction of the said valve with which it is associated to establish a potential thereacross of sufficient magnitude and such polarity as to hold the respective said next to be operated valve nonconductive, each said time delay network impedance element controlling the rate of discharge of its respective said storage device whereby the time required to reduce the voltage across said delay network device below said established voltage is greater than the time period between successive pulsations of the potential applied to said next valve.

20. A timing apparatus comprising a plurality of electric circuits, each said circuit having an initial and an actuated condition, means for selectively rendering a first of said circuits into its actuated condition, a subsequent one of said circuits including a reactive network, conducting means for applying at least a portion of the potential appearing across said reactive network to said first circuit to render said first circuit in its said initial condition as a consequence of the rendering of said subsequent circuit in its said actuated condition.

21. A timing apparatus comprising a plurality of electric circuits, each said circuit having an initial and an actuated condition, means for selectively rendering a first of said circuits into its actuated condition, means operable as a consequence of said first circuit being rendered in said actuated condition for maintaining said first circuit in said actuated condition irrespective of said selective means, a subsequent one of said circuits including a reactive network, conducting means for applying at least a portion of the potential appearing across said reactive network to said first circuit to render said first circuit in its said initial condition as a consequence of the rendering of said subsequent circuit in its said actuated condition.

22. A timing apparatus comprising a plurality of electric circuits, each said circuit having an initial and an actuated condition, means for selectively rendering a first of said circuits into its actuated condition, means operable as a consequence of said first circuit being rendered in said actuated condition for maintaining said first circuit in said actuated condition irrespective of said selective means, a subsequent one of said circuits including a reactive network, conducting means for applying at least a portion of the potential appearing across said reactive network to said first circuit whereby said maintaining means is rendered ineffective and said first circuit is rendered in its said initial condition as a consequence of the rendering of said subsequent circuit in its said actuated condition.

23. A timing apparatus comprising a plurality of electric circuits, each said circuit having an initial and an actuated condition, switch means for selectively rendering a first of said circuits into its actuated condition, an electric valve controlling a circuit in parallel with said switch means, means controlling the conductivity of said valve and including means rendering said valve conductive as a consequence of said first circuit being rendered in its said actuated condition, a subsequent one of said circuits including a reactive network, said valve controlling means also including conducting means for applying at least a portion of the potential appearing across said reactive network to said valve to render said valve nonconductive as a consequence of the rendering of said subsequent circuit in its said actuated condition.

24. An electrical network comprising a plurality of sequentially actuated electric valves each having a pair of principal electrodes and a control electrode, means providing a source of alternating potential across said principal electrodes of each said valve, a plurality of impedance devices individually associated with at least some of said valves, said devices being individually connected in series with said principal electrodes of the one of said valves with which it is associated, circuit means individually connecting said valves, certain of said circuit means having input terminals connected across a prior to be actuated one of said devices and having output terminals connected between one of said principal electrodes and said control electrode of a subsequent to be actuated one of said valves so that conduction through such subsequent valve is prevented so long as the potential appearing across such impedance device is above a predetermined value, a circuit connected to said device of a later to be actuated one of said valves and connected between said control electrode and one of said pair of principal electrodes of an earlier to be actuated one of said valves, and means for initiating a change in conduction of said earlier valve.

25. In an electrical apparatus, an electrical network for controlling an operating function of a machine, said controlling network including an electric valve and a time delay impedance network in series circuit therewith and charged by flow of current therethrough, said time delay impedance network being effective to determine the time-length of said operating function, an initiating network for initiating an operation of said controlling network, means for selectively applying a potential to said initiating network to thereby energize said initiating network, said initiating network including a valve having a control electrode and normally maintained in a condition in which said valve will conduct when said initiating network is energized by said selective means, control means responsive to an operating condition of said controlling network for applying a bias potential to said control electrode to thereby deenergize said initiating network, said initiating network being effective upon being rendered deenergized to actuate said controlling network to its original condition, and said apparatus including time delay means for preventing reenergization of said initiating network for a predetermined time interval after it is deenergized by said control means.

26. In an electrical apparatus, an electrical network for controlling an operating function of a machine, an initiating network including an electric valve for initiating an operation of said controlling network, said valve having a pair of electrodes controlling current flow therethrough, a first switch means for selectively energizing said initiating network, a second switch means in parallel arrangement with said first switch means and rendered conducting as a consequence of the rendering of said first network in its said energized condition for maintaining said initiating network in its said energized condition, means responsive to an operating condition of said controlling network for applying a blocking bias potential between said electrodes whereby said initating network is de-energized, said initiating network being effective upon being de-energized to actuate said controlling network to its original condition, and time delay means for maintaining said last-named means effective for a predetermined time interval subsequent to said initiating network being rendered in its deenergized condition.

27. In an electrical apparatus, an electrical network for controlling an operating function of a machine, an initiating network including an electric valve for initiating an operation of said controlling network, said valve having a pair of electrodes controlling current flow therethrough, a first switch means for selectively energizing said initiating network, a second switch means in parallel arrangement with said first switch means and rendered conductive as a consequence of the rendering of said first network in its said energized condition for maintaining said initiating network in said energized condition, means responsive to an operating condition of said controlling network for applying a blocking bias potential between said electrodes whereby said initiating network is de-energized, said initiating network being effective upon being de-energized to actuate said controlling network to its original condition, and time delay means for maintaining said last-named means effective for a predetermined time interval subsequent to said initiating network being rendered in its de-energized condition, said time means comprising an energy storage device.

28. A timer for timing a sequence of events including electric discharge devices each having a control electrode and a plurality of principal electrodes, the events being initiated and terminated by changing the conductivity of certain of said electric discharge devices, said timer also including energy storage components and components for discharging said storage components between the control electrode and principal electrode of each of said devices; said timer being characterized by the fact that said storage components are charged by current flowing between the anode and cathodes of corresponding ones of said discharge devices when said devices are rendered conductive.

29. In combination in a sequence timer, a first thyratron having an anode and cathode; a first network consisting of a resistor in parallel with a capacitor connected to the anode of said first thyratron; a second thyratron having an anode, a cathode and a grid; a connection between the anode of the first thyratron and the grid of the second thyratron; a second network consisting of a resistor in parallel with a capacitor connected to the anode of said second thyratron; a third thyratron having an anode, cathode and grid; a connection between the anode of the second thyratron and the grid of the third; a third network consisting of a resistor in parallel with a capacitor connected to the anode of said third thyratron; a fourth thyratron having an anode, cathode and grid; a connection between the anode of the third thyratron and the grid of the fourth and a fourth network consisting of a resistor in parallel with a capacitor connected to the anode of said fourth thyratron.

30. In combination in a sequence timer, a first electric discharge device having an anode and cathode; a first network consisting of a resistor in parallel with a capacitor connected to the anode of said electric discharge device; a second electric discharge device having an anode, a cathode and a grid; a connection between the anode of the first electric discharge device and the grid of the second electric discharge device; a second network consisting of a resistor in parallel with a capacitor connected to the anode of the second electric discharge device; a third electric discharge device having an anode, cathode and grid, a connection between the anode of the second electric discharge device and the grid of the third; a third network consisting of a resistor in parallel with a capacitor connected to the anode of said third electric discharge device; a fourth electric discharge device having an anode, cathode and grid; a connection between the anode of the third electric discharge device and the grid of the fourth and a fourth network consisting of a resistor in parallel with a capacitor connected to the anode of said fourth electric discharge device.

31. In a timing apparatus, a plurality of potential supplying busses, a first and a second group of said busses being arranged to provide a potential therebetween which alternately reverses in accordance with a predetermined pattern, each said group comprising at least one conductor, a plurality of electronic valves each having a pair of principal electrodes and a control electrode, each pair of principal electrodes comprising an anode and a cathode, circuit means connecting said principal electrodes of each said valve to said busses whereby a potential will be placed across each of said pairs of principal electrodes, impedance networks arranged in series in said circuit means intermediate corresponding ones of said principal electrodes and the ones of said busses to which they are connected, one of said valves having its anode connected to said first group and its cathode connected to said second group, another of said valves having its cathode connected to said first group and its anode connected to said second group, circuit means for applying at least a portion of the potential bias appearing across a first one of said networks associated with said one valve between said controlling element and one of said principal electrodes of said other valve whereby said one and said other valves are connected for sequential operation, the last to be actuated of said valves having its respective main electrodes connected to respectively opposite groups of said busses than are the principal electrodes of a first to be actuated of said valves, and conductor means for applying at least a portion of the potential appearing across the impedance network associated with the last to be actuated of said valves to said control electrode of the first to be actuated of said valves for controlling the conductivity of the first to be actuated of said valves.

32. In a timing apparatus, a plurality of potential supplying busses, a first and a second group of said busses being arranged to provide a potential therebetween which alternately reverses in accordance with a predetermined pattern, each said group comprising at least one conductor, a plurality of electronic valves each having a pair of principal electrodes and a control electrode, said pair of principal electrodes comprising an anode and a cathode, circuit means connecting said principal electrodes of each said valve to said busses whereby a potential will be placed across each of said pairs of principal electrodes, impedance networks arranged in series in said circuit means intermediate corresponding ones of said principal electrodes and the ones of said busses to which they are connected, selectively actuated switch means for controlling the current flow through a first of said valves, circuit means for applying at least a portion of the potential bias appearing across one of said networks between said controlling element and one of said principal electrodes of a successive one of said valves whereby said successive valve is connected for sequential operation, the last to be actuated one of said valves having its respective main electrodes connected to respectively opposite groups of said busses than the principal electrodes of the first to be operated of said valves, and conductor means interconnecting the impedance network associated with said anode of the last one of said valves to the control electrode of said first valve.

33. In an electric current control system, a gaseous conduction device having a cathode and a control electrode, a controlled D. C. bias circuit for said gaseous conduction device, said bias circuit comprising a condenser shunted by a discharge resistance, means for connecting said condenser between said cathode and said control electrode, a charging circuit for said condenser comprising a source of alternating current and a thyratron connected in series with said condenser, means normally maintaining said thyratron at firing bias, a source of control voltage, and means responsive to said control voltage for developing cutoff bias for said thyratron.

34. In combination, an electric discharge device having at least an anode, a cathode, and a control element, biasing means for maintaining said discharge device normally non-conducting, means, cooperative with said biasing means, for rendering said device conductive and means responsive to the anode current through said device and operable in the control element circuit of said device for maintaining said discharge device conductive after said rendering means becomes ineffective.

35. The combination comprising an electric discharge device having an anode, a cathode and at least one control element, biasing means for maintaining said discharge device normally non-conductive, means cooperative with said biasing means for rendering said device conductive and means including a transformer responsive to the anode current of said discharge device for maintaining said discharge device conductive when said rendering means becomes ineffective.

36. In combination, a first electric discharge device having an anode, a cathode, and a control element; first biasing means for maintaining said first discharge device normally non-conductive; means responsive to the conduction of said first discharge device for overcoming said first biasing means to maintain said first discharge device conductive; second biasing means for rendering said discharge device again non-conductive after it has been rendered conductive; a second electric discharge device, and means responsive to the conduction of said second discharge device for again rendering said first discharge device conductive.

37. In combination valve means for controlling the flow of current from an alternating-current source through a load, a circuit connected to said valve means for rendering said valve means conductive and including means to determine the instants in each cycle of said source at which said valve means becomes conductive, a timer for measuring a predetermined period of time, said time including an electric valve controlled by said timer to conduct current for said predetermined period of time, a second electric valve in said circuit adapted to permit conduction in said circuit only when said second valve is conductive, and connections between said first and said second valve such that said first valve controls the conductivity of said second valve.

38. In combination valve means for controlling the flow of current from an alternating-current source through a load, a circuit connected to said valve means for rendering said valve means conductive and including means to determine the instants in each cycle of said source at which said valve means becomes conductive, a timer adapted to measure a predetermined period of time and including an electric valve controlled by said timer to conduct current for said predetermined period of time, a second electric valve having an anode, cathode and control electrode in said circuit adapted to permit conduction in said circuit only when said control electrode is at or above a predetermined potential with respect to said cathode, an impedance connected between said control electrode and said cathode, and a circuit between said first electric valve and said impedance, 39. In combination valve means for controlling the flow of current from an alternating-current source through a load, a circuit connected to said valve means for rendering said valve means conductive and including means to determine the instants in each cycle of said source at which said valve means becomes conductive, a timer adapted to measure a predetermined period of time and including an electric valve controlled by said timer to conduct current for said predetermined period of time, a second electric valve having an anode, cathode and control electrode in said circuit adapted to permit conduction in said circuit only when said control electrode is above a predetermined potential with respect to said cathode, energy storage impedance connected between said control electrode and said cathode, a circuit between said first electric valve and said impedance, and a circuit for substantially discharging said impedance in a time interval of one cycle.

40. In a timing circuit operable from a source of alternating potential, a pair of electric valves each having a pair of main electrodes and a control element, a first circuit connected between said element and one of said main electrodes of a first of said valves and normally ineffective to hold said electrodes of said first valve in a nonconducting condition, means for rendering said first circuit into a first condition for applying a blocking potential to said first valve whereby said electrodes of said first valve are rendered nonconductive, a second circuit including said first valve electrodes and a time delay impedance network chargeable as a consequence of the conduction of said first valve and dischargeable when said first valve is rendered nonconductive, a third circuit including said electrodes of a second of said valves and including a control device actuated as a consequence of a change in conductive condition of said second valve, potential supplying means deriving its energy from said delay network and connected between said element and one of said electrodes of said second valve and polarized to maintain said second valve nonconductive when the charge on said network is above a predetermined minimum value, a fourth control circuit operable to be controlled between a first and a second operating condition, means responsive to the rendering of said first circuit in said first condition for rendering said fourth circuit from its said first to its said second condition, and means including said third circuit device for rendering said fourth circuit from its said second to its said first condition as a consequence of said second valve being rendered conductive by said delay network.

41. In a timing circuit operable from a source of alternating potential, a pair of electric valves each having a pair of main electrodes and a control element, a first circuit connected between said element and one of said main electrodes of a first of said valves and including a chargeable device and control means for normally maintaining said device ineffective to apply a blocking bias potential between said element and one of said first valve main electrodes whereby conduction between said electrodes of said first valve is permitted, means for rendering said control means into a first condition for causing said chargeable device to apply a blocking potential to said first valve whereby conduction between said first valve electrodes is prevented, a second circuit including said first valve electrodes and a time delay impedance network chargeable as a consequence of the conduction between said first valve electrodes and dischargeable when conduction between said first valve electrodes is prevented, a third circuit including said electrodes of a second of said valves and including an impedance device the potential whereof is variable as a consequence of a change in conductive condition of said second valve, potential supplying means deriving its energy from said delay network and connected between said element and one of said electrodes of said second valve and polarized to maintain said second valve nonconductive when the charge on said delay network is above a predetermined minimum value, a control device operable to be controlled between a first and a second operating condition, means including a portion of said first circuit and effective as a consequence of said first circuit being rendered in said first condition for actuating said control device from its said first to its said second condition, and means including said impedance device for rendering said control device from its said second to its said first condition as a consequence of said second valve being rendered conductive by said delay network.

42. The combination of claim 41 in which said first circuit control means is an electric valve and said means for rendering said control means to said first condition is a time delay network selectively rendered effective.

43. In a timing device, a plurality of sequentially actuated electric valves; at least certain of said valves having a pair of main electrodes and a control electrode; individual impedance networks individually coupled in series with said main electrodes of said valves and arranged to be energized by flow of current through the respective said values with which such networks are associated; means normally supplying an alternating potential between said main electrodes of at least some of said valves; circuit means for applying a potential, proportional to that appearing across said network associated with a just prior operated one of said valves, between one of said main electrodes and said control electrode of the next to be operated one of said valves; an initiating an operation of said sequentially actuated valves and including a normally conductive initiating valve having a pair of main electrodes and a control electrode and including circuit controlling means normally maintained in a nonconducting condition for controlling the application of potential between said main electrodes of said initiating valve; said circuit controlling means including selectively operated means for initially applying potential to said initiating valve main electrodes whereby said initiating valve is rendered conducting; means rendered effective as a consequence of the conduction of said initiating valve to cause said plurality of valves to be sequentially actuated; said circuit controlling means including a second normally open current controlling device; said current controlling device being rendered in a condition to maintain potential between said main electrode of said initiating valve as a consequence of the rendering of said initiating valve conductive; and means responsive to a function of the potential appearing across said impedance network associated with the last to be operated of said plurality of valves for applying a blocking bias potential between said control electrode and one of said main electrodes of said initiating valve.

44. In a pulsating electric potential timing network for controlling the sequence of a plurality of operations, a plurality of electric valves adapted to be actuated in sequence, each said valve having a pair of principal electrodes and a control electrode, a principal electrode circuit for each of said valves including conductors adapted to be energized from a source of periodic potential, impedance networks, individual ones of said networks being individually connected in series in at least some of said electrode circuits and charged as a consequence of current flow through the corresponding electrode circuits, circuit means energized by the potential appearing across prior to being actuated by said delay networks and connected between said control electrode and one of said principal electrodes of next to be operated said valves, each said time delay network being operable as a consequence of the conduction of the said valve with which it is associated to establish a potential thereacross of sufficient magnitude and polarity to hold the respective said next to be operated valve nonconductive, certain of said valves being of the discontinuous control type, said ones of said networks, which are associated with the ones of said valves which are actuated just prior to said certain valves, being of the type in which the discharge time of said network is proportioned to maintain said potential for a determined time interval to measure desired time intervals between certain of said operations, each said network having a time constant such that when the said valve associated therewith is nonconductive said established potential will be maintained for a period greater than the period between the pulsations of said periodic potential applied to the respective said next valve.

45. In a timing apparatus, a plurality of electric circuits, each said circuit having an initial and an actuated condition, means for selectively rendering a first of said circuits into its actuated condition, a subsequent one of said circuits including a controlling network, said controlling network including an energy storage device having a loading element connected in parallel therewith, said circuits including conducting means for applying at least a portion of the potential appearing across said controlling network to said first circuit and in such polarity as to render said first circuit in its said initial condition as a consequence of the rendering of said subsequent circuit in its said actuated condition, and said circuits including means actuated as a consequence of said first circuit being rendered in its said initial condition to render said subsequent circuit in its said initial condition.

46. In a timing apparatus, a plurality of electric circuits, means for selectively connecting a first of said circuits to a source of potential to render said first circuit in a conductive condition, a subsequent one of said circuits including a controlling network, said controlling network comprising a reactive element having a resistive element connected in parallel, said circuit including means responsive to said circuits being rendered in said conductive condition to render said subsequent circuit in a conductive condition, said circuit comprising conductive means for applying at least a portion of a potential appearing across said controlling network to said first circuit to render said first circuit in a nonconducting condition as a consequence of the rendering of said subsequent circuit in its said conducting condition, said first circuit responsive means further being effective to render said subsequent circuit in a nonconducting condition as a consequence of said first circuit being rendered in said nonconducting condition.

47. In a timing apparatus, a plurality of electric circuits, means for selectively connecting a first of said circuits to a source of potential to render said first circuit in a conducting condition, said circuit including current responsive means for maintaining said source connected to said first network as a consequence of said first circuit being rendered conductive, a subsequent one of said circuits including a controlling network, said controlling network comprising a reactive element and a resistive element connected in parallel, said circuits including means responsive to said first circuit being rendered in said conductive condition to render said subsequent circuit in a conductive condition, said circuits including a conducting means for applying at least a portion of the potential appearing across said timing network to said first circuit to render said first circuit in a nonconducting condition as a consequence of the rendering of said subsequent circuit in its said conducting condition, said first circuit responsive means further being effective to render said subsequent circuit in a nonconducting condition as a consequence of said first circuit being rendered in said nonconducting condition.

48. In a timing apparatus a first potential bus means and a second potential bus means, circuit means adapted to be supplied from a source of alternating current and arranged to energize said bus means whereby during one half of the voltage wave of said source said first bus means is positive with respect to said second bus means and during the next succeeding half cycle the relative polarities of said bus means are reversed, each said bus means including at least one conductor, a plurality of discontinuous control-type valves each having an anode and a cathode and at least one controlling electrode, certain first ones of each said valves having their anodes connected to one of said bus means and their cathodes connected to another of said bus means, certain other of said valves having their anodes connected to said other bus means and their cathodes connected to said one bus means, impedance networks in series with the said certain valve anodes with which they are associated, at least one of said certain first valves being paired with at least one of said certain other valves to provide at least one pair of associated valves, and conductor means individually interconnecting the impedance network associated with the anode of said last-named certain first one valve to said controlling electrode of said certain last-named other first valve.

References Cited in the file of this patent
UNITED STATES PATENTS

| | | |
|---|---|---|
| 2,011,381 | Suits | Aug. 13, 1935 |
| 2,099,065 | Holden | Nov. 16, 1937 |
| 2,279,311 | Gross | Apr. 14, 1942 |
| 2,289,322 | Collum | July 7, 1942 |
| 2,295,601 | Overbeck | Sept. 15, 1942 |
| 2,319,524 | Undy | May 18, 1943 |
| 2,340,077 | Pearson | Jan. 25, 1944 |
| 2,398,771 | Compton | Apr. 23, 1946 |
| 2,402,916 | Schroeder | June 25, 1946 |
| 2,403,955 | Schlesinger | July 16, 1946 |
| 2,430,983 | Hoover | Nov. 18, 1947 |
| 2,533,369 | Hartwig | Dec. 12, 1950 |
| 2,590,582 | Stadum et al. | Mar. 25, 1952 |
| 2,600,337 | Stadum | June 10, 1952 |
| 2,623,168 | Stadum et al. | Dec. 23, 1952 |

U. S. DEPARTMENT OF COMMERCE
PATENT OFFICE

CERTIFICATE OF CORRECTION

Patent No. 2,826,720            March 11, 1958

Gustav E. Undy

It is hereby certified that error appears in the printed specification of the above numbered patent requiring correction and that the said Letters Patent should read as corrected below.

Column 3, line 64, for "predermined" read -- predetermined --; column 6, line 55, for "SWAa" read -- SW2a --; column 9, line 44, for "should" read -- Should --; column 17, line 21, for "each" read -- said --; column 20, line 27, before "an" insert -- network for initiating --.

Signed and sealed this 6th day of May 1958.

(SEAL)
Attest:

KARL H. AXLINE                                    ROBERT C. WATSON
Attesting Officer                                Commissioner of Patents